(12) United States Patent
Tadakuma et al.

(10) Patent No.: US 10,843,506 B2
(45) Date of Patent: Nov. 24, 2020

(54) OMNI-DIRECTIONAL ROTATIONAL DRIVE MECHANISM AND MOVING BODY

(71) Applicant: TOHOKU UNIVERSITY, Sendai (JP)

(72) Inventors: Kenjiro Tadakuma, Sendai (JP); Eri Takane, Sendai (JP); Masahiro Fujita, Sendai (JP); Masashi Konyo, Sendai (JP); Satoshi Tadokoro, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 37 days.

(21) Appl. No.: 16/305,819

(22) PCT Filed: Mar. 31, 2017

(86) PCT No.: PCT/JP2017/013654
§ 371 (c)(1),
(2) Date: Nov. 29, 2018

(87) PCT Pub. No.: WO2017/212754
PCT Pub. Date: Dec. 14, 2017

(65) Prior Publication Data
US 2019/0184737 A1    Jun. 20, 2019

(30) Foreign Application Priority Data
Jun. 7, 2016 (JP) .................................. 2016-113392

(51) Int. Cl.
*B62M 13/00* (2010.01)
*B60B 19/00* (2006.01)
(Continued)

(52) U.S. Cl.
CPC .......... *B60B 19/003* (2013.01); *B60K 7/0007* (2013.01); *F16H 1/16* (2013.01);
(Continued)

(58) Field of Classification Search
CPC .. H02K 16/00; H02K 49/102; H02K 2213/09; H02K 7/1166; H02K 2213/06;
(Continued)

(56) References Cited

U.S. PATENT DOCUMENTS

| 5,633,555 A | 5/1997 | Ackermann et al. |
| 8,162,092 B2 * | 4/2012 | Takenaka ............. B60B 19/003 180/221 |

(Continued)

FOREIGN PATENT DOCUMENTS

| JP | H07-264838 A | 10/1995 |
| JP | 2009-179110 A | 8/2009 |

(Continued)

OTHER PUBLICATIONS

Nomura et al., "Screw-type Differential Rotating Mechanism—Implementation as Omnidirectional Drive Wheel," Abstracts of the 34th annual conference of the Robotics Society of Japan, Sep. 7, 2016, pp. 414-417.

(Continued)

*Primary Examiner* — Toan C To
(74) *Attorney, Agent, or Firm* — Oliff PLC

(57) ABSTRACT

An omni-directional rotational drive mechanism and a moving body in which production and maintenance can be facilitated, while the size can be reduced, by making the number of components smaller. A rotating body provided for a wheel member rotatable about a ring-shaped shaft having a rotating shaft of the wheel member as its center. The rotating body is configured to rotate integrally with the wheel member about the rotating shaft. A pair of worms rotatable about the same shaft as the rotating shaft of the wheel member. A pair of worm wheels are provided for the wheel member so as to be rotatable by meshing with different worms, and capable of transmitting each of rota- (Continued)

tions to the rotating body. The rotating body is configured so as to rotate or stop with respect to the wheel member in accordance with the rotational direction and the rotational speed of the respective worms.

6 Claims, 4 Drawing Sheets

(51) Int. Cl.
*F16H 1/16* (2006.01)
*F16H 1/20* (2006.01)
*F16H 49/00* (2006.01)
*F16H 37/08* (2006.01)
*B60K 7/00* (2006.01)
*H02K 16/00* (2006.01)
*H02K 7/116* (2006.01)
*H02K 49/10* (2006.01)
*F16H 1/22* (2006.01)
*B62K 11/00* (2006.01)
*B60B 35/12* (2006.01)

(52) U.S. Cl.
CPC .......... *F16H 1/20* (2013.01); *F16H 37/0806* (2013.01); *F16H 49/00* (2013.01); *H02K 7/1166* (2013.01); *H02K 16/00* (2013.01); *B60B 35/124* (2013.01); *B60K 2007/003* (2013.01); *B60K 2007/0038* (2013.01); *B62K 11/007* (2016.11); *F16H 1/225* (2013.01); *H02K 49/102* (2013.01); *H02K 2213/06* (2013.01); *H02K 2213/09* (2013.01)

(58) Field of Classification Search
CPC ... B60B 19/003; B60B 35/124; B62K 11/007; B60K 2007/003; B60K 7/0007; B60K 2007/0038; F16H 1/225; F16H 1/20; F16H 1/16; F16H 49/00; F16H 37/0806

USPC .......................................... 180/21, 210, 220
See application file for complete search history.

(56) References Cited

U.S. PATENT DOCUMENTS

| | | | |
|---|---|---|---|
| 8,577,516 B2* | 11/2013 | Takenaka | B62K 1/00 |
| | | | 701/1 |
| 9,573,416 B1* | 2/2017 | Niemeyer | B60B 19/003 |
| 10,245,952 B1* | 4/2019 | Patterson | B62M 23/00 |
| 2011/0070997 A1* | 3/2011 | Gomi | B60B 9/06 |
| | | | 476/66 |
| 2011/0233989 A1 | 9/2011 | Takenaka et al. | |
| 2013/0299260 A1* | 11/2013 | Shimizu | B62H 1/12 |
| | | | 180/220 |
| 2013/0299263 A1* | 11/2013 | Shimizu | B62K 11/007 |
| | | | 180/220 |
| 2016/0304163 A1* | 10/2016 | Yoshino | B60B 19/003 |
| 2017/0210444 A1* | 7/2017 | Yada | B60B 19/12 |

FOREIGN PATENT DOCUMENTS

| | | |
|---|---|---|
| WO | 2010/064408 A1 | 6/2010 |
| WO | 2012/012215 A2 | 1/2012 |
| WO | 2015/156263 A1 | 10/2015 |

OTHER PUBLICATIONS

Tadakuma et al., "Omnidirectional Wheel Mechanism with a Dual-Rings," No. 16-2 Proceedings of the 2016 JSME Conference on Robotics and Mechatronics, Jun. 8-11, 2016, pp. 2559-2560.

Nomura et al., "Screw-type Differential Rotating Mechanism," The 16th SICE System Integration Division Annual Conference (SI2016), Dec. 15-17, 2016, pp. 1073-1078.

May 16, 2017 International Search Report issued in International Patent Application No. PCT/JP2017/013654.

Sep. 6, 2019 Search Report issued in European Patent Appliation No. 17809937.

* cited by examiner

OMNI-DIRECTIONAL ROTATIONAL DRIVE MECHANISM AND MOVING BODY

FIELD OF THE INVENTION

The present invention relates to an omni-directional rotational drive mechanism and a moving body.

DESCRIPTION OF RELATED ART

Conventionally, an omni-directional moving vehicle comprising a plurality of sub-wheels arranged in an outer circumference of a main wheel, the sub-wheels being provided so as to be rotatable about a ring-shaped shaft having a rotating shaft of the main wheel as its center, wherein the main wheel and the respective sub-wheels can be rotated and driven by a pair of motors that are provided outside of the main wheel, has been developed as an object utilizing an omni-directional rotational drive mechanism. Such an omni-directional moving vehicle includes, for example, a vehicle comprising, for respective sub-wheels, left driving rollers and right driving rollers that are each provided so as to rotate the respective sub-wheels from the left and right, wherein by rotating all the left driving rollers with one of the motors and all the right driving rollers with the other motor via endless belts, the rotational direction and the rotational speed of the main wheel and the respective sub-wheels are controlled in accordance with the rotational direction and the rotational speed of the respective motors (see, for example, Patent Literature 1).

In addition, the omni-directional moving vehicle also includes a vehicle in which respective motors are provided so as to rotate about the same shaft as a rotating shaft of a main wheel, the vehicle comprising differential mechanisms each attached to the rotating shaft of the respective motors and a rotation transmission member that transmits rotations of the respective differential mechanisms to some of sub-wheels so as to rotate the respective sub-wheels, and the vehicle being configured so as to be capable of transmitting rotations from the some of the sub-wheels to other sub-wheels, wherein the rotational direction and the rotational speed of the main wheel and the respective sub-wheels are controlled in accordance with the rotational direction and the rotational speed of the respective motors (see, for example, Patent Literature 2).

CITATION LIST

Patent Literature 1: WO 2010/064408
Patent Literature 2: JP-A-2009-179110

SUMMARY OF THE INVENTION

However, since the rotations of the respective motors are transmitted to the respective left driving rollers and the respective right driving rollers with the respective endless belts in the omni-directional moving vehicle described in Patent Literature 1, there was a problem in that the size increases along the plane of rotation of the main wheel because the respective motors need to be arranged outside of the outer circumference of the main wheel. In addition, there was also a problem in that the number of components becomes large, and production and maintenance become complicated, because the left driving rollers and the right driving rollers each need to be provided as many as the sub-wheels. Furthermore, there was also a problem in that driving force cannot be secured when dust or dirt is attached to the surfaces of the respective rollers because a friction transmission method is used.

In addition, the omni-directional moving vehicle described in Patent Literature 2 uses a bevel gear, a planetary gear, an endless belt, or the like as the differential mechanism or the rotation transmission member, and it needs a rotation transmission member consisting of two or more components to transmit rotations from the differential mechanism to the sub-wheels. There was a problem in that the whole part of the wheel increases in size because there is a need of making the distance from the rotating shaft of the main wheel to the respective sub-wheels longer or broadening the gap between the respective motors, to create a space for storing this rotation transmission member.

The present invention is made by focusing on such problems, and an object thereof is to provide an omni-directional rotational drive mechanism and a moving body having a smaller number of components, wherein production and maintenance can be facilitated, while the size can be reduced and driving force can be secured even when dust or dirt is attached.

In order to achieve the above-described objective, the omni-directional rotational drive mechanism according to the present invention is characterized in comprising: a wheel member that is provided so as to be rotatable about a rotating shaft; a rotating body that is provided for the above-described wheel member so as to be rotatable about a ring-shaped shaft having the rotating shaft of the above-described wheel member as its center, and that is configured so as to integrally rotate with the above-described wheel member about the rotating shaft of the above-described wheel member; a pair of first gears that are each provided so as to be rotatable about the same shaft as the rotating shaft of the wheel member; and a pair of second gears that are each provided for the above-described wheel member so as to be rotatable about a shaft approximately vertical to the rotating shaft of the above-described wheel member with rotations of different first gears, and capable of transmitting each of rotations to the above-described rotating body, wherein the first gears and the second gears corresponding to each other are each made of worms and worm wheels or non-contact gears that are provided so as to be capable of transmitting force to each other, and the above-described rotating body is configured so as to rotate or stop with respect to the above-described wheel member in accordance with the rotational direction and the rotational speed of the respective first gears.

The omni-directional rotational drive mechanism according to the present invention can transmit each of the rotations of the respective first gears to the rotating body via the corresponding second gears. At this time, for example, the respective second gears are configured to rotate or stop so as to rotate the above-described rotating body in opposite directions with respect to each other when the respective first gears are rotated in the same direction, and the respective second gears are configured to rotate so as to rotate the above-described rotating body in the same direction when the respective first gears are rotated in opposite directions. In this manner, it is possible to rotate or stop the rotating body with respect to the wheel member in accordance with the rotational direction and the rotational speed of the respective first gears.

In this case, when the rotations of the respective second gears are both transmitted to the rotating body without waste, it is possible to rotate only the rotating body and stop the wheel member. In addition, when the rotations of the respective second gears cancel each other completely, it is possible to stop the rotating body together with the respective second gears. At this time, rotational force of the respective first gears is directly transmitted to the wheel member, and thus the wheel member can be rotated in the same direction as the respective first gears. When the rotations of the respective second gears are in states between them, the rotational direction and the rotational speed of the rotating body and the wheel member are determined in accordance with a difference in the rotational force of the respective second gears. Thus, the omni-directional rotational drive mechanism according to the present invention can rotate the rotating body and the wheel member in an arbitrary direction at an arbitrary speed by controlling the rotations of the respective first gears. In this manner, the omni-directional rotational drive mechanism according to the present invention can be used as an omni-directional moving wheel that is movable in an arbitrary direction at an arbitrary speed.

The omni-directional rotational drive mechanism according to the present invention can transmit the rotations of the respective first gears to the rotating body just with the respective second gears, at the least. Thus, the number of components for transmitting the rotations can be decreased, and the size of the whole mechanism can be reduced. In addition, production and maintenance can be facilitated by making the number of components smaller. Furthermore, since driving force is transmitted using the first gears and the second gears, not by a friction transmission method, the driving force can be secured even when dust or dirt is attached.

The omni-directional rotational drive mechanism according to the present invention can make transmission of rotational force to the respective worms (first gears) from the corresponding worm wheels (second gears) harder by setting the lead angles of the respective worms (first gears) smaller, when the first gears and the second gears corresponding to each other are each made of worms and worm wheels. In this manner, when the rotations of the respective worms (first gears) are stopped, rotations of the wheel member and the rotating body can be prevented, and a state in which a brake is applied can be achieved. In addition, in the case of being made of non-contact gears, the respective first gears and the respective second gears are made of, for example, magnetic gears that are provided so as to be capable of transmitting force with magnetic force, electrostatic gears that are provided so as to be capable of transmitting force with electrostatic force, or the like. It should be noted that, in the omni-directional rotational drive mechanism according to the present invention, the outer surface of the rotating body that is positioned on the opposite side of the rotating shaft of the wheel member is preferably arranged outside of the outer circumference of the wheel member so as to surely enable the movement by the rotating body.

In the omni-directional rotational drive mechanism according to the present invention, the above-described rotating body is preferably present in a plural number, each of them being provided so as to be aligned along the outer circumference of the above-described wheel member. In this case, a gap between adjacent rotating bodies can be reduced or can be eliminated along the outer circumference of the wheel member, and thus when used as an omni-directional moving wheel, it can be smoothly moved in an arbitrary direction at an arbitrary speed. In addition, by increasing the number of the rotating body, the widths of the respective rotating bodies can be reduced, and the respective rotating bodies can be rotated more smoothly.

In addition, in the case where there are a plurality of such rotating bodies, the second gears may be present in a plurality of pairs corresponding to the respective rotating bodies, and they may be configured so as to be capable of transmitting each of rotations of the second gears of the respective pairs to the corresponding respective rotating bodies. In this manner, rotations can be transmitted from the second gears of the respective pairs to the respective rotating bodies, and the respective rotating bodies can surely be rotated. Furthermore, the second gears may be present in one pair or a plurality of pairs that are fewer than the respective rotating bodies, wherein rotational force may be each transmitted from the second gears of the respective pairs to different rotating bodies, and rotating bodies to which rotations are not transmitted with the second gears of the respective pairs may be coupled to the rotating bodies to which rotations are transmitted with the second gears of the respective pairs so as to enable rotations of those rotating bodies. In this manner, the number of components for transmitting the rotations of the respective first gears to the respective rotating bodies can be made smaller, and production and maintenance can be facilitated.

The omni-directional rotational drive mechanism according to the present invention may comprise a pair of motors that are each provided so as to be capable of rotating and driving different first gears, and capable of controlling a rotational direction and a rotational speed thereof. In this case, the moving direction and the moving speed when used as an omni-directional moving wheel can be controlled by controlling the rotations of the respective motors. In addition, the respective motors can be arranged outside of the wheel member along the rotating shaft of the wheel member. Thus, it is possible to use motors having larger driving force as compared to a case in which the respective motors are provided inside of the wheel member, and thus driving force of the wheel member and the rotating body can be enlarged. In addition, power wiring and the like can be easily performed on the respective motors.

The moving body according to the present invention is characterized in comprising one or a plurality of the omni-directional rotational drive mechanism according to the present invention as wheels.

The moving body according to the present invention can move in an arbitrary direction at an arbitrary speed by using the omni-directional rotational drive mechanism according to the present invention.

According to the present invention, it is possible to provide an omni-directional rotational drive mechanism and a moving body having a smaller number of components, wherein production and maintenance can be facilitated, while the size can be reduced and driving force can be secured even when dust or dirt is attached.

DETAILED DESCRIPTION OF THE INVENTION

Hereinafter, embodiments of the present invention will be described based on the drawings.

Figure 1:
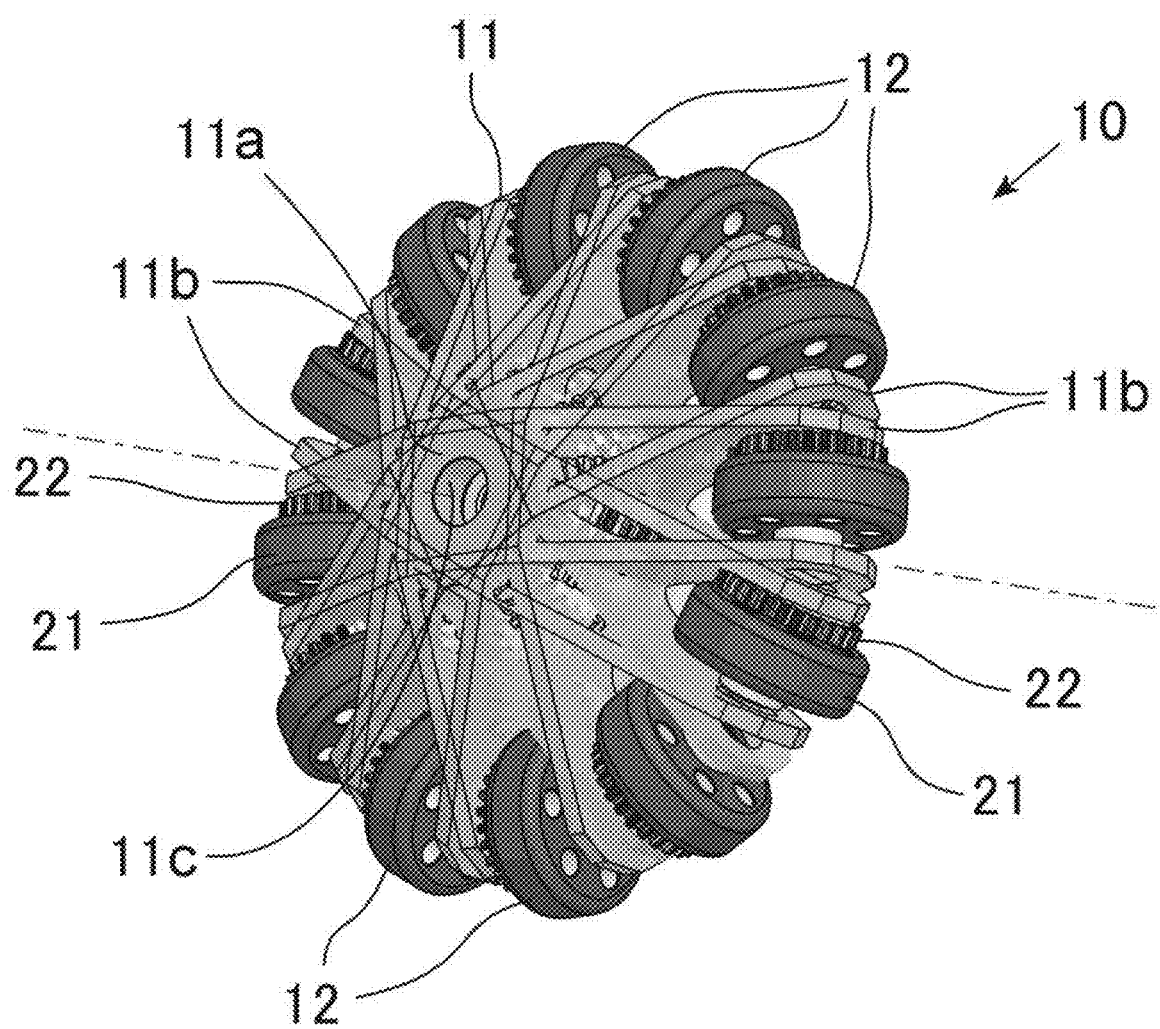
FIG. 1 is a perspective view illustrating an omni-directional rotational drive mechanism according to First Embodiment of the present invention.
Figure 2:
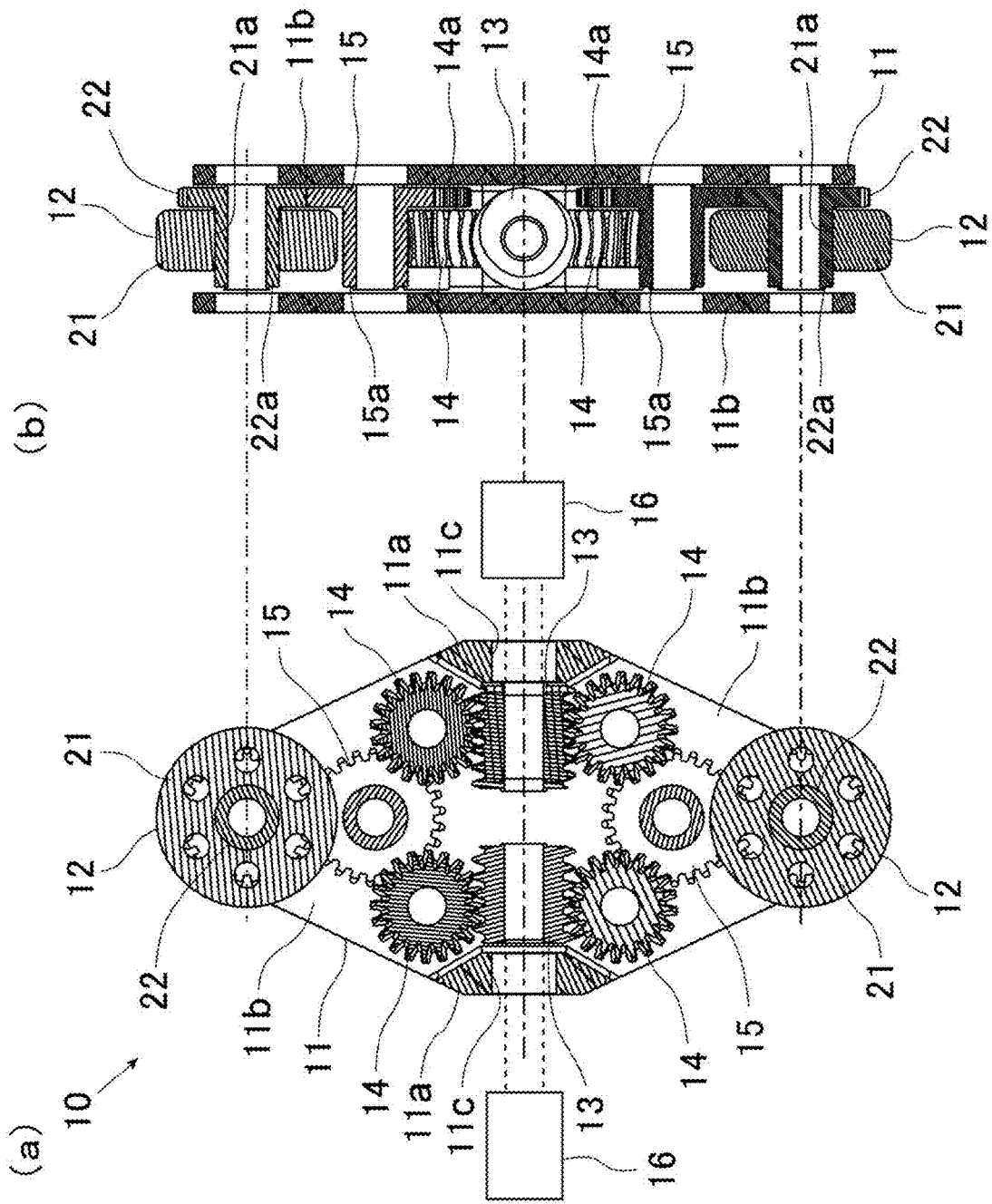
FIG. 2 is (a) a cross-sectional view and (b) a longitudinal sectional view, illustrating a structure between two pairs of spokes sandwiching a central shaft of a wheel member in the omni-directional rotational drive mechanism illustrated in FIG. 1.
Figure 3:
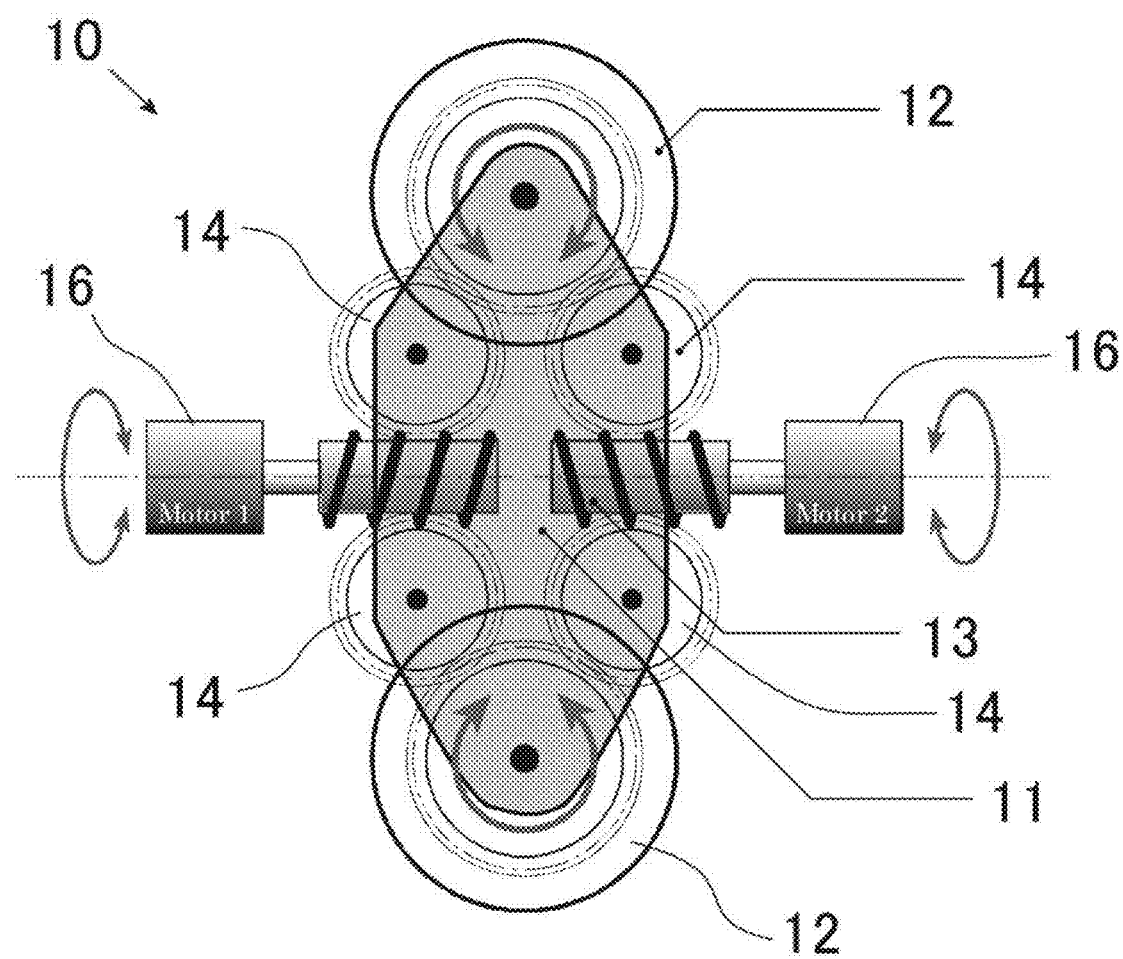
FIG. 3 is a schematic cross-sectional view illustrating a structure between two pairs of spokes sandwiching a central shaft of a wheel member in a modification example of the omni-directional rotational drive mechanism according to First Embodiment of the present invention.

FIG. 1 to FIG. 3 illustrate an omni-directional rotational drive mechanism and a moving body according to First Embodiment of the present invention.

As illustrated in FIG. 1 and FIG. 2, an omni-directional rotational drive mechanism 10 comprises: a wheel member 11; a plurality of rotating bodies 12; a pair of worms 13; a plurality of pairs of worm wheels 14; a plurality of transmission gears 15; and a pair of motors 16. It should be noted that the worms 13 and the worm wheels 14 correspond to first gears and second gears, respectively.

As illustrated in FIG. 1, the wheel member 11 has a disk-like outer shape, and it comprises a central part 11a that is provided at the center thereof and a plurality of spokes 11b radially extending from the central part 11a. The wheel member 11 is configured so as to be rotatable about a central shaft passing through the central part 11a. The central part 11a comprises a through-hole 11c in the middle. The respective spokes 11b are in the forms of plates having thicknesses in the central shaft direction, and the distal ends have approximately arc shapes. The respective spokes 11b are in pairs, and two spokes 11b of the respective sets are provided in approximately parallel at predetermined intervals. The respective spokes 11b are provided with respect to the central shaft, at predetermined angle intervals per set. The respective spokes 11b are provided such that they intersect with the spokes 11b of the adjacent sets and the distal ends line up per set along the circumference of the wheel member 11.

As illustrated in FIG. 1 and FIG. 2, the respective rotating bodies 12 comprise a small-diameter wheel 21 and a gear for wheel 22. The small-diameter wheel 21 is in the form of a column having a small thickness, and it comprises an insertion hole 21a in the middle. The gear for wheel 22 is made of a spur gear, and it comprises a projecting part 22a that projects to one of the surfaces in the middle. The gear for wheel 22 is fixed to the small-diameter wheel 21 by inserting the projecting part 22a into the insertion hole 21a of the small-diameter wheel 21. In this manner, the respective rotating bodies 12 are configured such that the small-diameter wheel 21 and the gear for wheel 22 integrally rotate.

The respective rotating bodies 12 are arranged one by one between the distal ends of the spokes 11b of the respective sets such that they each line up along the outer circumference of the wheel member 11. The respective rotating bodies 12 are arranged such that their central shaft is vertical to the central shaft of the wheel member 11. The respective rotating bodies 12 are attached to the spokes 11b sandwiching them so as to be rotatable about the central shaft. In this manner, the respective rotating bodies 12 are each configured to be rotatable about a ring-shaped shaft having the rotating shaft of the wheel member 11 as its center, i.e., a shaft vertical to the central shaft of the wheel member 11.

The respective rotating bodies 12 are arranged such that their outer surfaces positioned on the opposite side of the rotating shaft of the wheel member 11 come to the outside of the outer circumference of the wheel member 11. In addition, the respective rotating bodies 12 are configured such that they integrally rotate with the wheel member 11 about the rotating shaft of the wheel member 11, when the wheel member 11 rotates about its rotating shaft.

As illustrated in FIG. 2(a), the respective worms 13 are arranged in the inside of the central part 11a of the wheel member 11, in the front and back direction along the rotating shaft of the wheel member 11. The respective worms 13 are each provided so as to be rotatable independently of the wheel member 11 about the same shaft as the rotating shaft of the wheel member 11. The respective worms 13 have the same size, wherein the lead angles are the same and the directions of grooves are opposite to each other.

As illustrated in FIG. 2, the worm wheels 14 of the respective pairs are provided one pair by one pair between the respective spokes 11b, corresponding to the respective rotating bodies 12. The respective worm wheels 14, all have the same size, and they are each provided so as to be rotatable about a shaft vertical to the central shaft of the wheel member 11. The worm wheels 14 of the respective pairs are each attached to the spokes 11b of the corresponding sets such that one worm wheel 14 is rotatable while meshing with one worm 13, and the other worm wheel 14 is rotatable while meshing with the other worm 13. In addition, the respective worm wheels 14 comprise a pinion 14a rotating about the same shaft, that is fixed to the lateral surface on the same side. The pinion 14a is a spur gear.

The respective transmission gears 15 are provided one by one between the respective spokes 11b, corresponding to the respective rotating bodies 12. The respective transmission gears 15 are made of spur gears, and they comprise a projecting part 15a, which projects to one of the surfaces in the middle. The respective transmission gears 15 are each provided for the spokes 11b of the corresponding pairs so as to be rotatable about a shaft vertical to the central shaft of the wheel member 11. The respective transmission gears 15 are each arranged between the corresponding rotating bodies 12 and the worm wheels 14 of the corresponding pairs, and are attached so as to mesh with those rotating bodies 12 and the pinions 14a of the worm wheels 14 of those pairs.

In the omni-directional rotational drive mechanism 10, the rotating shafts of the rotating body 12 and the transmission gear 15 corresponding to each other are arranged within a plain surface vertical to the rotating shaft of the wheel member 11, the plain surface passing through the center of the wheel member 11. In addition, with respect to the corresponding transmission gear 15, one worm wheel 14 is arranged so as to mesh with that transmission gear 15 from the right side of the central shaft of that transmission gear 15, while the other worm wheel 14 meshes from the left side thereof. In this manner, both of the worm wheels 14 of the respective pairs transmit each of the rotations to the same corresponding transmission gear 15, and that transmission gear 15 further transmits those rotations to the corresponding rotating body 12.

The respective motors 16 are arranged on the opposite sides of the wheel member 11 along the rotating shaft of the wheel member 11. The respective motors 16 are provided outside of the wheel member 11. The respective motors 16 are configured so as to be capable of rotating and driving the worms 13 arranged on their sides, through the through-hole of the central part 11a of the wheel member 11. In addition, the respective motors 16 are configured so as to be capable of controlling the rotational direction and the rotational speed of the corresponding worms 13.

Next, working effects will be described.

The omni-directional rotational drive mechanism 10 can rotate the wheel member 11 and the respective rotating bodies 12 by rotating the respective worms 13 with the respective motors 16. More specifically, if the respective worms 13 are rotated in the opposite directions at the same speed, force to rotate in the same direction at the same speed will be transmitted to the respective transmission gears 15 via the worm wheels 14 of the respective pairs, and thus the respective transmission gears 15 can be rotated in that direction at that speed. In this manner, the respective rotating bodies 12 can be rotated in the opposite direction of the respective transmission gears 15 via the respective transmission gears 15. At this time, the rotations of the worm wheels 14 of the respective pairs are both transmitted to the rotating bodies 12 without waste, and thus the wheel member 11 can be stopped.

In addition, if the respective worms 13 are rotated in the same direction at the same speed, force to rotate in the opposite directions at the same speed will be transmitted to the respective transmission gears 15 via the worm wheels 14 of the respective pairs, and thus the rotations of the worm wheels 14 of the respective pairs offset each other completely, and the worm wheels 14 of the respective pairs and the respective transmission gears 15 can be stopped. In this manner, the respective rotating bodies 12 can also be stopped. At this time, rotational force of the respective worms 13 is directly transmitted to the wheel member 11, and thus the wheel member 11 can be rotated in the same direction and at the same speed as the respective worms 13.

In addition, if the respective worms 13 are rotated at different speeds, force to rotate at different speeds can be transmitted to the respective transmission gears 15 via the worm wheels 14 of the respective pairs. At this time, not only the respective rotating bodies 12 are rotated via the respective transmission gears 15, but the wheel member 11 can also be rotated, in accordance with a difference in the force. In addition, the rotational direction and the rotational speed of the respective rotating bodies 12 and the wheel member 11 are determined in accordance with the difference in the force transmitted to the respective transmission gears 15. Thus, the omni-directional rotational drive mechanism 10 can rotate the respective rotating bodies 12 and the wheel member 11 in an arbitrary direction at an arbitrary speed by controlling the rotations of the respective worms 13 with the respective motors 16. In this manner, the omni-directional rotational drive mechanism 10 can be used as an omni-directional moving wheel that is movable in an arbitrary direction at an arbitrary speed.

Since the respective motors 16 are arranged outside of the wheel member 11 along the rotating shaft of the wheel member 11 in the omni-directional rotational drive mechanism 10, it is possible to use those having larger driving force as compared to a case in which the respective motors 16 are provided inside of the wheel member 11, and thus driving force of the wheel member 11 and the respective rotating bodies 12 can be enlarged. In addition, power wiring and the like can be easily performed on the respective motors 16.

The omni-directional rotational drive mechanism 10 can make transmission of rotational force to the respective worms 13 from the corresponding worm wheels 14 harder by setting the lead angles of the respective worms 13 smaller. In this manner, when the rotations of the respective worms 13 are stopped, rotations of the wheel member 11 and the rotating bodies 12 can be prevented, and a state in which a brake is applied can be achieved. Thus, at the time of use as an omni-directional moving wheel, it is possible to continuously stop in slopes and the like without consuming energy.

It should be noted that, as illustrated in FIG. 3, the omni-directional rotational drive mechanism 10 may be capable of transmitting rotations directly from the worm wheels 14 of the respective pairs to corresponding rotating bodies 12, without comprising the respective transmission gears 15. In this case, the number of components for transmitting rotations can be decreased, and the size of the whole mechanism can be reduced. In addition, production and maintenance can be facilitated by making the number of components smaller. Furthermore, since driving force is transmitted using the worms 13 and the worm wheels 14 not by a friction transmission method, driving force can be secured even when dust or dirt is attached.

Moreover, the omni-directional rotational drive mechanism 10 may be configured such that: the worm wheels 14 are present in one pair or a plurality of pairs that are fewer than the respective rotating bodies 12; the worm wheels 14 of the respective pairs each transmit rotations to different rotating bodies 12; and the rotating bodies 12 to which the rotations are not transmitted with the worm wheels 14 of the respective pairs are coupled to the rotating bodies 12 to which the rotations are transmitted with the worm wheels 14 of the respective pairs so as to enable rotations of those rotating bodies 12. In this manner, the number of components for transmitting rotations of the respective worms 13 to the respective rotating bodies 12 can be made smaller, and production and maintenance can be facilitated.

In addition, in the omni-directional rotational drive mechanism 10, the respective worms 13 may have grooves of the same direction. In this case, the same movement as in FIG. 2 is enabled by inserting one spur gear between one worm wheel 14 of the worm wheels 14 of the respective pairs and the corresponding transmission gear 15. Furthermore, the rotational direction of the respective rotating bodies 12 with respect to the rotational direction of the respective worms 13 can be arbitrarily changed by inserting one or a plurality of gears between the respective worm wheels 14 and the corresponding transmission gears 15 or between the respective transmission gears 15 and the corresponding rotating bodies 12.

Figure 4:
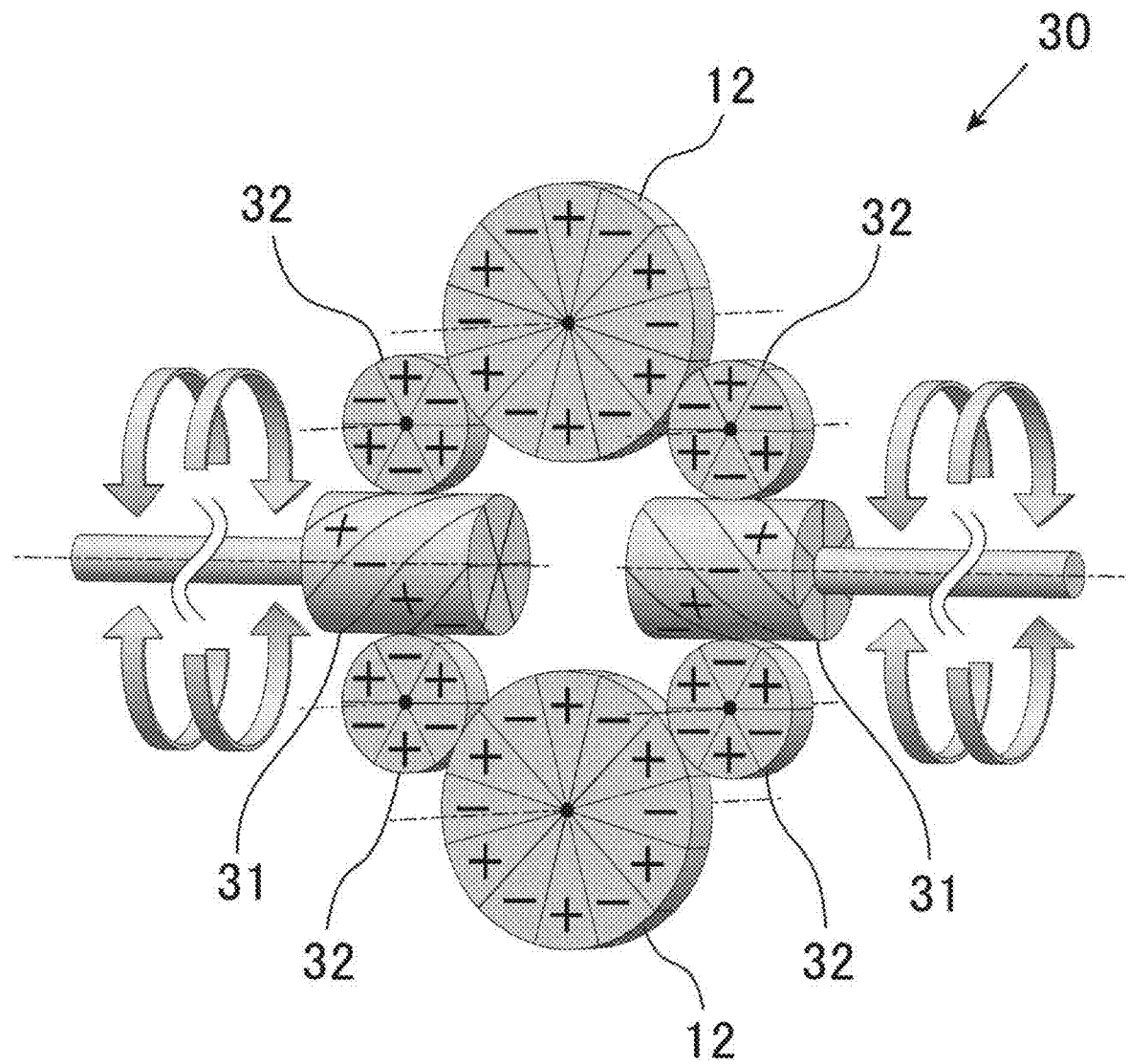
FIG. 4 is a perspective view illustrating an omni-directional rotational drive mechanism according to Second Embodiment of the present invention.

FIG. 4 illustrates an omni-directional rotational drive mechanism according to Second Embodiment of the present invention.

As illustrated in FIG. 4, an omni-directional rotational drive mechanism 30 comprises: a wheel member 11 (not illustrated); a plurality of rotating bodies 12; a pair of first electrostatic gears 31; a plurality of pairs of second electrostatic gears 32; and a pair of motors 16 (not illustrated). It should be noted that the first electrostatic gears 31 and the second electrostatic gears 32 correspond to first gears and second gears, respectively. In addition, in the descriptions below, configurations that are the same as those of the omni-directional rotational drive mechanism 10 according to First Embodiment of the present invention are given the same reference signs so as to omit overlaps in descriptions.

The respective first electrostatic gears 31 are in columnar shapes extending along the rotating shaft of the respective motors 16. A + (plus) region and a − (minus) region that are formed in spiral shapes at predetermined widths, are alternately provided on the lateral surfaces of the respective first electrostatic gears 31. The respective second electrostatic gears 32 are in thin columnar shapes, and the + region and the − region are alternately provided at predetermined widths along the circumferential direction on the lateral surfaces thereof. The respective rotating bodies 12 are also made of thin columnar-shaped electrostatic gears, and they have outer diameters larger than those of the respective second electrostatic gears 32. On the lateral surfaces of the respective rotating bodies 12, the + region and the − region are alternately provided at predetermined widths along the circumferential direction.

The omni-directional rotational drive mechanism 30 is capable of transmitting rotations directly from the second electrostatic gears 32 of the respective pairs to corresponding rotating bodies 12, without comprising the transmission gears 15. In the omni-directional rotational drive mechanism 30, the first electrostatic gears 31 and the second electrostatic gears 32 corresponding to each other, and the second electrostatic gears 32 and the rotating bodies 12 corresponding to each other, are provided so as to be capable of transmitting force to each other with electrostatic force. More specifically, the respective first electrostatic gears 31 and the respective second electrostatic gears 32 are configured such that the + region and the − region of the respective first electrostatic gears 31 rotate while opposing the − region and the + region of the corresponding second electrostatic gears 32, respectively. In addition, the respective second electrostatic gears 32 and the respective rotating bodies 12 are configured such that the + region and the − region of the respective second electrostatic gears 32 rotate while opposing the − region and the + region of the corresponding rotating bodies 12, respectively.

In this manner, as in the case of the omni-directional rotational drive mechanism 10, the omni-directional rotational drive mechanism 30 enables rotations of the wheel member 11 and the respective rotating bodies 12 by rotating the respective first electrostatic gears 31 with the respective motors 16. Since the omni-directional rotational drive mechanism 30 utilizes a non-contact gear, there is no energy loss or wear of gears due to friction, and it is excellent in quietness.

It should be noted that the omni-directional rotational drive mechanism 30 may be configured such that the respective first electrostatic gears 31, the respective second electrostatic gears 32, and the respective rotating bodies 12 are made, not of electrostatic gears, but of magnetic gears that are provided so as to be capable of transmitting force with magnetic force. In this case, for example, a region in which the magnetic force is N-pole and a region in which that is S-pole should be formed so as to correspond to the + region and the − region illustrated in FIG. 4, respectively. In this manner, as in the case of the omni-directional rotational drive mechanism 10, it is possible to rotate the wheel member 11 and the respective rotating bodies 12 by rotating the respective first gears (magnetic gears corresponding to the first electrostatic gears 31) with the respective motors 16.

The omni-directional rotational drive mechanism 10 and the omni-directional rotational drive mechanism 30 can be used as omni-directional moving wheels of a moving body. In this case, it is possible to move that moving body in an arbitrary direction at an arbitrary speed. In addition, the omni-directional rotational drive mechanism 10 and the omni-directional rotational drive mechanism 30 can be configured as omni-directionally movable crawlers when used as wheels of crawlers (caterpillar track). Furthermore, the omni-directional rotational drive mechanism 10 and the omni-directional rotational drive mechanism 30 can also be used as joint parts of robots and the like. In this case, joints can be bent in arbitrary directions. In addition, it is also possible to maintain joints at arbitrary postures without consuming energy. Furthermore, by providing an elastic body, a damper, or the like, it is possible to avoid application of loads on power transmission parts of joints even when impact is applied from the outside.

REFERENCE SIGNS LIST 10, 30: Omni-directional rotational drive mechanism
11: Wheel member
11a: Central part
11b: Spoke
11c: Through-hole
12: Rotating body
21: Small-diameter wheel
21a: Insertion hole
22: Gear for wheel
22a: Projecting part
13: Worm
14: Worm wheel
14a: Pinion
15: Transmission gear
15a: Projecting part
16: Motor
31: First electrostatic gear
32: Second electrostatic gear

What is claimed is:

1. An omni-directional rotational drive mechanism, comprising:
   a wheel member that is provided so as to be rotatable about a rotating shaft;
   a rotating body that is provided for the wheel member so as to be rotatable about a ring-shaped shaft having the rotating shaft of the wheel member as its center, and that is configured so as to integrally rotate with the wheel member about the rotating shaft of the wheel member;
   a pair of first gears that are each provided so as to be rotatable coaxially with the rotating shaft of the wheel member; and
   a pair of second gears that are each provided for the wheel member so as to be rotatable about a shaft approximately vertical to the rotating shaft of the wheel member with rotations of different first gears, and capable of transmitting each of the rotations to the rotating body, wherein
   the first gears and the second gears corresponding to each other are each made of (a) worms and worm wheels or (b) non-contact gears that are provided so as to be capable of transmitting force to each other, and
   the rotating body is configured so as to rotate or stop with respect to the wheel member in accordance with the rotational direction and the rotational speed of the respective first gears.

2. The omni-directional rotational drive mechanism according to claim 1, wherein the respective second gears are configured to rotate or stop so as to rotate the rotating body in opposite directions with respect to each other when the respective first gears are rotated in the same direction, and the respective second gears are configured to rotate so as to rotate the rotating body in the same direction when the respective first gears are rotated in opposite directions.

3. The omni-directional rotational drive mechanism according to claim 1, wherein
   the rotating body is present in a plural number, each of them being provided so as to line up along an outer circumference of the wheel member, and
   the second gears are present in a plurality of pairs corresponding to the respective rotating bodies, and are configured to be capable of transmitting each of rotations of the second gears of the respective pairs to the corresponding respective rotating bodies.

4. The omni-directional rotational drive mechanism according to claim 1, comprising a pair of motors that are each provided so as to be capable of rotating and driving different first gears, and capable of controlling a rotational direction and a rotational speed thereof.

5. The omni-directional rotational drive mechanism according to claim 1, wherein an outer surface of the rotating body that is positioned on the opposite side of the rotating shaft of the wheel member is arranged outside of an outer circumference of the wheel member.

6. A moving body, comprising one or a plurality of the omni-directional rotational drive mechanism according to claim 1, as wheels.

* * * * *